United States Patent
Bordes et al.

(10) Patent No.: US 12,096,032 B2
(45) Date of Patent: Sep. 17, 2024

(54) METHOD AND APPARATUS FOR SIGNALING DECODING DATA USING HIGH LEVEL SYNTAX ELEMENTS

(71) Applicant: InterDigital VC Holdings, Inc., Wilmington, DE (US)

(72) Inventors: Philippe Bordes, Laille (FR); Michel Kerdranvat, Cesson-Sevigne (FR); Edouard Francois, Bourg des Comptes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 30 days.

(21) Appl. No.: 17/619,831

(22) PCT Filed: Jun. 17, 2020

(86) PCT No.: PCT/US2020/038090
§ 371 (c)(1),
(2) Date: Dec. 16, 2021

(87) PCT Pub. No.: WO2020/263646
PCT Pub. Date: Dec. 13, 2020

(65) Prior Publication Data
US 2022/0312041 A1   Sep. 29, 2022

(30) Foreign Application Priority Data

Jun. 24, 2019  (EP) .................................... 19305818

(51) Int. Cl.
*H04N 19/70* (2014.01)
*H04N 19/136* (2014.01)
(Continued)

(52) U.S. Cl.
CPC ........... *H04N 19/70* (2014.11); *H04N 19/136* (2014.11); *H04N 19/44* (2014.11); *H04N 19/46* (2014.11)

(58) Field of Classification Search
CPC ...... H04N 19/70; H04N 19/136; H04N 19/44; H04N 19/46
See application file for complete search history.

(56) References Cited

U.S. PATENT DOCUMENTS 9,654,802 B2 * 5/2017 Wang ..................... H04N 19/70
9,918,091 B2 * 3/2018 Wang .................. H04N 19/196
(Continued)

FOREIGN PATENT DOCUMENTS

CN    115398922 A  * 11/2022  ........... H04N 19/132
EP    2847997 A1    3/2015
(Continued)

OTHER PUBLICATIONS

Boyce, Jill: "AHG17/AHG15: On VVC HLS relevant to MPEG requirements on immersive media delivery and access (N18134)", Joint Video Experts Team (JVET-N0278-V4), Mar. 26, 2019 (Mar. 26, 2019), XP030204997 (Year: 2019).*
(Continued)

*Primary Examiner* — Michael Robert Cammarata
(74) *Attorney, Agent, or Firm* — CONDO ROCCIA KOPTIW LLP

(57) ABSTRACT

Methods and apparatuses for signaling decoding data in a video bitstream, wherein one uses a syntax element indicating whether the decoding data are explicitly coded in the video bitstream or inferred from previous data of the video bitstream. A bitstream, a computer-readable storage medium and a computer program product are also described.

18 Claims, 17 Drawing Sheets

(51) Int. Cl.
*H04N 19/44* (2014.01)
*H04N 19/46* (2014.01)

(56) References Cited

U.S. PATENT DOCUMENTS

| | | | | |
|---|---|---|---|---|
| 10,715,833 | B2* | 7/2020 | Zheng | H04N 19/70 |
| 2013/0194384 | A1 | 8/2013 | Hannuksela | |
| 2014/0086333 | A1* | 3/2014 | Wang | H04N 21/235 |
| | | | | 375/240.26 |
| 2015/0103886 | A1* | 4/2015 | He | H04N 19/70 |
| | | | | 375/240.02 |
| 2015/0264372 | A1* | 9/2015 | Kolesnikov | H04N 19/52 |
| | | | | 375/240.16 |
| 2016/0057441 | A1* | 2/2016 | Skupin | H04N 19/36 |
| | | | | 375/240.25 |
| 2016/0255359 | A1* | 9/2016 | Yu | H04N 19/46 |
| | | | | 375/240.15 |
| 2016/0353117 | A1 | 12/2016 | Seregin et al. | |
| 2017/0347106 | A1* | 11/2017 | Sasai | H04N 19/117 |
| 2021/0250590 | A1* | 8/2021 | Gao | H04N 19/96 |
| 2021/0258598 | A1* | 8/2021 | Hendry | H04N 19/463 |
| 2021/0281835 | A1* | 9/2021 | Filippov | H04N 19/503 |
| 2021/0321114 | A1* | 10/2021 | Hannuksela | H04N 19/70 |
| 2021/0368209 | A1* | 11/2021 | Coban | H04N 19/1883 |
| 2022/0086493 | A1* | 3/2022 | Francois | H04N 19/157 |
| 2022/0150479 | A1* | 5/2022 | Rosewarne | H04N 19/186 |
| 2022/0159294 | A1* | 5/2022 | Yoo | H04N 19/176 |
| 2023/0027478 | A1* | 1/2023 | Deng | H04N 19/139 |
| 2023/0188709 | A1* | 6/2023 | Sim | H04N 19/105 |
| | | | | 375/240.02 |
| 2023/0244855 | A1* | 8/2023 | Attwater | G06F 40/20 |
| | | | | 715/254 |

FOREIGN PATENT DOCUMENTS

| | | | | | |
|---|---|---|---|---|---|
| EP | | 3057325 | A1 | | 8/2016 |
| EP | | 3306938 | A1 | | 4/2018 |
| KR | | 20150013547 | A | * | 2/2015 |
| WO | WO-2020058890 | A1 | * | 3/2020 | H04N 19/109 |
| WO | WO-2020245497 | A1 | * | 12/2020 | H04N 19/119 |

OTHER PUBLICATIONS

Boyce, Jill, "AHG15: On Interoperability Point Signalling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0276, 2019. (Year: 2019).*

Jill Boyce: "BoG report on high level syntax", JVET-M0816-V3, Joint Video Experts Team (JVET) of ITU-T SG 16 WP 3 and ISO/IEC JTC 1/SC 29/WG 11, 13th Meeting, Jan. 15, 2019 (Jan. 15, 2019), Marrakech,—MA, XP030202250 (Year: 2019).*

Anonymous, "Series H: Audiovisual and Multimedia Systems, Infrastructure of audiovisual services—Coding of moving video, High efficiency video coding", ITU-T H.265 Telecommunication Standardization Sector of ITU, Recommendation ITU-T H.265, Oct. 2014, 540 pages.

Deshpande, Sachin, "On Tile Group Signalling," Joint Video Experts Team (JVET) of ITU-T SG 16 WP 3 and ISO/IEC JTC 1/SC 29/WG 11, Document: JVET-N0124, 14th Meeting: Geneva, Switzerland, Mar. 19, 2019, 8 pages.

Boyce, Jill, "AHG15: On interoperability point signalling", Joint Video Experts Team (JVET) of ITU-T SG 16 WP 3 and ISO/IEC JTC 1/SC 29/WG 11, Document: JVET-N0276, 14th Meeting: Geneva, Switzerland, Mar. 19, 2019, 16 pages.

Schwarz et al., "Description of scalable video coding technology proposal by Fraunhofer HHI (Configuration B)," Joint Collaborative Team on Video Coding (JCT-VC) of ITU-T SG16 WP3 and ISO/IEC JTC1/SC29/WG11, Document: JCTVC-K0043_r1, 11th Meeting: Shanghai, China, Oct. 10, 2012, 36 pages.

Suehring et al., "AHG17: On Parameter Set Design for VVC", Joint Video Experts Team (JVET) of ITU-T SG 16 WP 3 and ISO/IEC JTC 1/SC 29/WG 11, Document: JVET-N0349, 14th Meeting: Geneva, Switzerland, Mar. 19, 2019, 2 pages.

Bross, et al., "Versatile Video Coding (Draft 4)", Joint Video Experts Team (JVET) of ITU-T SG 16 WP 3 and ISO/IEC JTC 1/SC 29/WG 11, Document JVET-M1001-v7, 13th Meeting: Marrakech, Morocco, Jan. 9, 2019, 300 pages.

Bross et al., "Versatile Video Coding (Draft 5)", JVET-N1001-v7, Joint Video Experts Team (JVET) of ITU-T SG 16 WP 3 and ISO/IEC JTC 1/SC 29/WG 11, 14th Meeting: Geneva, Switzerland, Mar. 19, 2019, 383 pages.

ISO/IEC, "Information Technology—Generic Coding of Moving Pictures and Associated Audio Information: Video", ISO 13818-2: 1995 (E), Recommendation ITU-T H.262, International Organization for Standardization (ISO) and the International Electrotechnical Commission (IEC), International Standard 13818-2, Jul. 1995, 211 pages.

ITU-T, "Transmission of Non-Telephone Signals: Information Technology—Generic Coding of Moving Pictures and Associated Audio Information: Systems", Recommendation ITU-T H.222.0, International Telecommunication Union, ITU-T Telecommunication Standardization Sector of ITU, Jul. 1995, 135 pages.

Boyce, Jill, "AHG17/AHG15: On VVC HLS Relevant to MPEG Requirements on Immersive Media Delivery and Access (N18134)", JVET-N0278, Intel, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-4.

* cited by examiner

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra constraint_flag | u(1) |
| no_partition_constraints_override_constraint_flag | u(1) |
| no_sao_constraint_flag | u(1) |
| no_alf_constraint_flag | u(1) |
| no_pcm_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_gbi_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
|    gci_alignment_zero_bit | f(1) |
| } | |

Fig. 3
PRIOR ART

| pic_parameter_set_rbsp( ) { | Descriptor |
|---|---|
| ... | |
| single_tile_in_pic_flag | u(1) |
| if( !single_tile_in_pic_flag ) { | |
|   num_tile_columns_minus1 | ue(v) |
|   num_tile_rows_minus1 | ue(v) |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   single_tile_per_tile_group_flag | u(1) |
|   if( !single_tile_per_tile_group_flag ) | |
|     rect_tile_group_flag | u(1) |
|   if( rect_tile_group_flag && !single_tile_per_tile_group_flag ) { | |
|     num_tile_groups_in_pic_minus1 | ue(v) |
|     for( i = 0; i <= num_tile_groups_in_pic_minus1; i++ ) { | |
|       if( i > 0 ) | |
|         top_left_tile_idx[ i ] | u(v) |
|       bottom_right_tile_idx_delta[ i ] | u(v) |
|     } | |
|   } | |
| ... | |

Fig. 5
PRIOR ART

| tile-group index | tile index list | top_left_tile_idx | bottom_right_tile_idx | bottom_right_tile_idx_delta |
|---|---|---|---|---|
| 0 | 0, 1, 2 | 0 | 2 | 2 |
| 1 | 3 | 3 | 3 | 0 |
| 2 | 4, 5 | 4 | 5 | 1 |
| 3 | 6, 7 | 6 | 7 | 1 |

| general_constraint_info( ) { | Descriptor |
|---|---|
| ... | |
|    use_default_constraint_flag | u(1) |
|    if ( !use_default_constraint_flag ) { | |
|       no_qtbtt_dual_tree_intra constraint_flag | u(1) |
|       no_partition_constraints_override_constraint_flag | u(1) |
|       no_sao_constraint_flag | u(1) |
|       no_alf_constraint_flag | u(1) |
|       no_pcm_constraint_flag | u(1) |
|       no_ref_wraparound_constraint_flag | u(1) |
|       no_temporal_mvp_constraint_flag | u(1) |
|       no_sbtmvp_constraint_flag | u(1) |
|       no_amvr_constraint_flag | u(1) |
|       no_bdof_constraint_flag | u(1) |
|       no_dmvr_constraint_flag | u(1) |
|       no_cclm_constraint_flag | u(1) |
|       no_mts_constraint_flag | u(1) |
|       no_sbt_constraint_flag | u(1) |
|       no_affine_motion_constraint_flag | u(1) |
|       no_gbi_constraint_flag | u(1) |
|       no_ibc_constraint_flag | u(1) |
|       no_ciip_constraint_flag | u(1) |
|       no_fpel_mmvd_constraint_flag | u(1) |
|       no_triangle_constraint_flag | u(1) |
|       no_ladf_constraint_flag | u(1) |
|       no_transform_skip_constraint_flag | u(1) |
|       no_qp_delta_constraint_flag | u(1) |
|       no_dep_quant_constraint_flag | u(1) |
|       no_sign_data_hiding_constraint_flag | u(1) |
|    } | |
|    // ADD reserved bits for future extensions | |
|    while( !byte_aligned( ) ) | |
|       gci_alignment_zero_bit | f(1) |
| } | |

Fig. 12

| profile_tier_level( maxNumSubLayersMinus1 ) { | Descriptor |
|---|---|
| general_profile_idc | u(7) |
| general_tier_flag | u(1) |
| general_sub_profile_idc | u(24) |
| use_default_constraint_flag | u(1) |
| if ( use-default_constraint_flag ) | |
|    general_constraint_info( ) | |
| general_level_idc | u(8) |
| for( i = 0; i < maxNumSubLayersMinus1; i++ ) | |
|    sub_layer_level_present_flag[ i ] | u(1) |
| while( !byte_aligned( ) ) | |
|    ptl_alignment_zero_bit | f(1) |
| for( i = 0; i < maxNumSubLayersMinus1; i++ ) | |
|    if( sub_layer_level_present_flag[ i ] ) | |
|       sub_layer_level_idc[ i ] | u(8) |
| } | |

Fig. 13

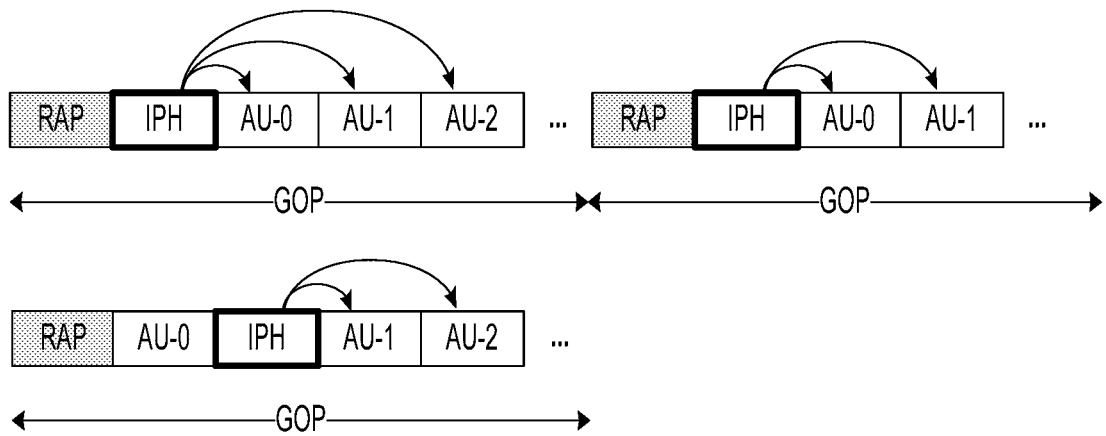

Fig. 17

| pic_parameter_set_rbsp( ) { | Descriptor |
|---|---|
| ... | |
| single_tile_per_tile_group_flag | u(1) |
| if( !single_tile_per_tile_group_flag ) | |
| rect_tile_group_flag | u(1) |
| if( rect_tile_group_flag && !single_tile_per_tile_group_flag ) { | |
| num_tile_groups_in_pic_minus1 | ue(v) |
| for( i = 0; i <= num_tile_groups_in_pic_minus1; i++ ) { | |
| if( i > 0 ) | |
| top_left_tile_idx[ i ] | u(v) |
| if( i < num_tile_groups_in_pic_minus1 ) | |
| bottom_right_tile_idx_delta[ i ] | u(v) |
| } | |
| } | |
| ... | |

Fig. 18

| Name | GOP length | index | GOP structure |
|---|---|---|---|
| RA | 9 | 0 | 084213657 |
| RA | 16 | 1 | 0 16 84213657 12 10 9 11 14 13 15 |
| LB | N | 2 | 0123456... N |
| LP | N | 3 | 0123456... N |

Fig. 20

METHOD AND APPARATUS FOR SIGNALING DECODING DATA USING HIGH LEVEL SYNTAX ELEMENTS

CROSS REFERENCE TO RELATED APPLICATIONS

This application is a U.S. National Stage Application under 35 U.S.C. 371 of International Patent Application No. PCT/US2020/038090, filed Jun. 17, 2020, which is incorporated herein by reference in its entirety.

This application claims the benefit of European Patent Application No. 19305818, filed Jun. 24, 2019, which is incorporated herein by reference in its entirety.

TECHNICAL FIELD

The present embodiments generally relate to signaling decoding data using High Level Syntax elements.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment. Accordingly, it should be understood that these statements are to be read in this light.

To achieve high compression efficiency, video coding schemes usually employ prediction and transform to leverage spatial and temporal redundancy in the video content. Generally, intra or inter prediction is used to exploit the intra or inter frame correlation. Then the differences between an original picture of the video and a predicted picture, often denoted as prediction errors or prediction residuals, are transformed, quantized and entropy coded. To reconstruct the picture, the compressed data is decoded by inverse processes corresponding to the prediction, transform, quantization and entropy coding.

SUMMARY

The present section provides a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one of the present embodiments, there is provided a method for signaling decoding data in a video bitstream, wherein the method comprises a step of using a syntax element indicating whether the decoding data are explicitly coded in the video bitstream or inferred from previous data of the video bitstream.

According to another general aspect of at least one of the present embodiments, there is provided an apparatus for signaling decoding data in a video bitstream, wherein the apparatus comprising means for using a syntax element indicating whether the decoding data are explicitly coded in the video bitstream or inferred from previous data of the video bitstream.

In one embodiment, a set of decoding data is split into subsets of decoding data and the step or the means for use a syntax element per subset indicating whether the decoding data of a subset are explicitly coded in the video bitstream or inferred from previous data of the video bitstream.

In one embodiment, the decoding data are constraint-flags controlling the activation of coding tools and wherein the syntax element indicates whether the constraint-flags are explicitly coded in the video bitstream or inferred from previous data of the video bitstream.

In one embodiment, the decoding data are decoding data of a header of a group of picture parts and wherein the syntax element indicates whether the decoding data of the header of the group of picture parts are explicitly coded in the video bitstream or inferred from decoding data of another header of a group of picture parts of the video bitstream.

In one embodiment, the decoding data of a header of a group of picture parts is a list of reference pictures and the previous data are a GOP structure and a number of reference frames.

In one embodiment, the decoding data are slice parameters and the previous data are a GOP structure and a decoded picture order.

In one embodiment, the decoding data are decoding data of a tile group and the previous data are decoding data of another tile group.

In one embodiment, the decoding data is a GOP structure and the previous data are some first decoded pictures in the GOP and the set of pre-defined GOP structures.

According to another general aspect of at least one embodiment, there is provided a method and device for encoding or decoding a video comprising signaling decoding data in a video bitstream according to one of the above methods.

According to other general aspects of at least one embodiment, there is provided a non-transitory computer readable storage medium, a computer program product and a bitstream.

The specific nature of at least one of the present embodiments as well as other objects, advantages, features and uses of said at least one of the present embodiments will become evident from the following description of examples taken in conjunction with the accompanying drawings.

BRIEF DESCRIPTION OF THE DRAWINGS

In the drawings, examples of several embodiments are illustrated. The drawings show:

FIG. 3 illustrates an example of a HLS element signaling constraint flags in accordance with prior art;

FIG. 5 illustrates an example of syntax elements for tiles in accordance with prior art;

FIG. 12 illustrates an example of a HLS element signaling constraint flags in accordance with at least one embodiment;

FIG. 13 illustrates an example of a HLS element in accordance with at least one embodiment;

FIG. 17 illustrates an example of a temporal organization of syntax elements associated with a GOP in accordance with at least one embodiment;

FIG. 18 illustrates an example of a syntax of a slice in accordance with at least one embodiment;

FIG. 20 illustrates a variant of the method of FIG. 19; and

DETAILED DESCRIPTION

Figure 1:
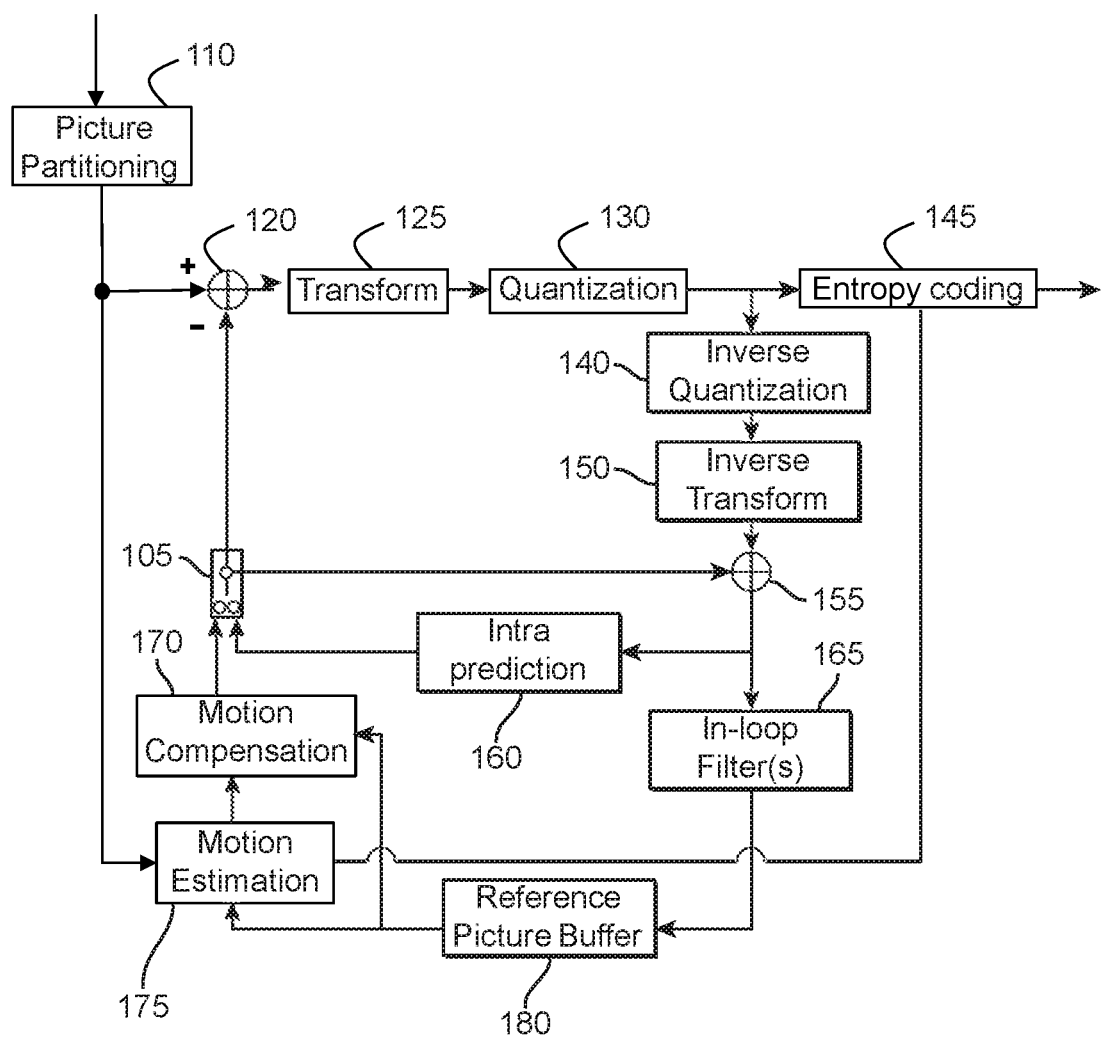
FIG. 1 illustrates a simplified block diagram of an exemplary encoder in accordance with an embodiment.

The present detailed description illustrates the principles of the present embodiments. It will thus be appreciated that those skilled in the art will be able to devise various arrangements that, although not explicitly described or shown herein, embody the principles of the present embodiments and are included within its scope.

All examples and conditional language recited herein are intended for educational purposes to aid the reader in understanding the principles of the present embodiments and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, that is, any elements developed that perform the same function, regardless of structure.

Thus, for example, it will be appreciated by those skilled in the art that the block diagrams presented herein represent conceptual views of illustrative circuitry embodying the principles of the present embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The present embodiments are described more fully hereinafter with reference to the accompanying figures, in which examples of said present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the present embodiments are intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Similar or same elements of figures are referenced with the same reference numbers.

Some figures represent syntax tables widely used in specification of video compression standards for defining the structure of a bitstream that conforms with said video compression standards. In those syntax tables, the term ' . . . ' denotes unchanged portions of the syntax with respect to a well-known definition given in a specification of a video compression standard and removed in the figures to facilitate reading. Bold terms in syntax tables indicate that a value for this term is obtained by parsing a bitstream. The right column of syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

In the claims hereof, any element expressed as a means for performing a specified function is intended to encompass any way of performing that function including, for example, a) a combination of circuit elements that performs that function orb) software in any form, including, therefore, firmware, microcode or the like, combined with appropriate circuitry for executing that software to perform the function. The present embodiments as defined by such claims reside in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present embodiments, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

In the following sections, the word "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture" and "frame" may be used interchangeably. Furthermore, the words "coding", "source coding" and "compression" may be used interchangeably.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present embodiments or its claims may refer to "determining" various pieces of information. Determining, deriving, the information may include one or more of, for example, estimating the information, calculating the information, predicting the information, or retrieving the information from memory.

Also, the application or its claims may refer to "providing" various pieces of information. Providing the information may include one or more of, for example, outputting the information, storing the information, transmitting the information, sending the information, displaying the information, showing the information, or moving the information.

Moreover, the application or its claims or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Further, the application or its claims may refer to "inferring" various data from previous data of a video bitstream. The term "previous data" is to be understood as data that has been built, reconstructed, parsed before the current data to be inferred. Note that one can infer data from data that has been inferred before (recursive inference). One particular case of inference is the default inference which uses default data as inferred data, that is "previous" data is default data. Inferring, deriving, from previous data of a video bitstream may include one or more of, for example, copying previous data or combining multiple previous data to get an inferred data, or accessing an information from the previous data that provides an indication of a mean for deriving an inferred data.

Further, the application or its claims may refer to "explicit coding of decoding data in a video bitstream" and "explicit decoding of decoding data from a video bitstream". Explicit coding (decoding) of decoding data refers to add (obtaining) dedicated syntax elements in (from) a video bitstream. Explicit encoding data may refer to enter/input at least one bin/information to an entropy coding engine (for example CABAC) representing this data, while inferring data refers to not entering any bin/information representing this data to the entropy coding engine. Similarly, Explicit decoding data refers to output at least one bin/information representing this data from the entropy decoding engine (that is CABAC) while inferring data refers to not output any bin/information representing this data to the entropy decoding engine. Note that the information whether a data is explicitly coded or inferred can be another syntax element that can be explicitly coded or inferred too.

For example, decoding data may be a slice parameter or an index of a table of pre-defined GOP structures. Then, encoding explicitly the slice parameters refers to adding a syntax element for this slice parameter or for the index of a table of pre-defined GOP structures in the video bitstream each time this decoding data are used during the decoding process.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

It is to be understood that a picture (also denotes image or frame) may be an array of luma samples in monochrome format, or an array of luma samples and two corresponding arrays of chroma samples in 4:2:0, 4:2:2, or 4:4:4 color format or three arrays of three color components (e.g. RGB).

In video compression standard, a picture is partitioned into blocks, possibly of different size and/or different shape.

It is to be understood that a block is a two-dimensional array or matrix. The horizontal or x direction (or axis) represents a width and the vertical or y direction (or axis) represents a height. The indexes start at 0. The x direction represents columns and the y direction represents rows. The maximum×index is the width −1. The maximum y index is the height −1.

Encoding

FIG. 1 illustrates a simplified block diagram of exemplary encoder 100 in accordance with at least one embodiment.

The encoder 100 may be included in a transmitter or headend in a communication system.

To encode a video sequence with one or more pictures, a picture is partitioned into blocks of possibly different size and/or different shape (module 110). For example, in HEVC ("*ITU-T H.265 TELECOMMUNICATION STANDARDIZATION SECTOR OF ITU* (October 2014), *SERIES H: AUDIOVISUAL AND MULTIMEDIA SYSTEMS, Infrastructure of audiovisual services—Coding of moving video, High efficiency video coding, Recommendation ITU-T H.265*"), a picture may be partitioned into CTUs (Coding Tree Units) of square shape with a configurable size. A consecutive set of CTUs may be grouped into a slice. A CTU is the root of a quad-tree partitioning into Coding Units (CUs) denoted blocks in the following.

In the exemplary encoder 100, a picture is encoded by block-based encoding modules as described below.

Each block is encoded using either an intra-prediction mode or inter-prediction mode.

When a block is encoded in an intra-prediction mode (module 160), the encoder 100 performs intra-prediction (also denoted spatial prediction), based on at least one sample of one block in the same picture (or on a pre-defined value for the first block of the picture or slice). As an example, a prediction block is obtained by intra-predicting a block from reconstructed neighboring samples.

When a block is encoded in an inter-prediction mode, the encoder 100 performs inter-prediction (also denoted temporal prediction), based on at least one reference block of at least one reference picture or slice (stored in the reference picture buffer).

Inter-prediction coding is performed by performing motion-estimation (module 175) and motion-compensating (module 170) a reference block stored in a reference picture buffer 180.

In uni-inter-prediction (a.k.a. uni-directional prediction) mode, the prediction block may be generally (but not necessarily) based on an earlier reference picture.

In bi-inter-prediction (a.k.a. bi-prediction) mode, the prediction block may be generally (but not necessarily) based on an earlier and a later picture.

The encoder 100 decides (module 105) which one of the intra-prediction mode or inter-prediction mode to use for encoding a block and indicates the intra/inter decision by a prediction mode syntax element.

A prediction residual block is calculated by subtracting (module 120) the prediction block (also known as a predictor) from the block.

The prediction residual block is transformed (module 125) and quantized (module 130). The transform module 125 may transform the prediction residual block from the pixel (spatial) domain to the transform (frequency) domain. The transform may be, for example, a cosine transform, a sine transform, a wavelet transform, etc. Quantization (module 130) may be performed according to, for example, a rate distortion criterion.

The quantized transform coefficients, as well as motion vectors and other syntax elements, are entropy coded (module 145) to output a bitstream. The entropy coding may be, for example, Context Adaptive Binary Arithmetic Coding (CABAC), Context Adaptive Variable Length Coding (CAVLC), Huffman, arithmetic, exp-Golomb, etc.

The encoder may also skip the transform and apply quantization directly to the non-transformed prediction residual block. The encoder may also bypass both transform and quantization, that is the prediction residual block is coded directly without the application of the transform or quantization process.

In direct PCM coding, no prediction is applied and the block samples are directly coded into the bitstream.

The encoder 100 comprises a decoding loop and thus decodes an encoded block to provide a reference for further predictions. The quantized transform coefficients are de-quantized (a.k.a. inverse quantization) (module 140) and inverse transformed (module 150) to decode prediction residual blocks. A block is then reconstructed by combining (module 155) the decoded prediction residual block and the prediction block. One or more in-loop filters (165) may be applied to the reconstructed picture, for example, to perform deblocking/Sample Adaptive Offset (SAO) filtering to reduce coding artifacts. The filtered picture is stored in the reference picture buffer 180.

The modules of encoder 100 may be implemented in software and executed by a processor or may be implemented using circuit components well-known by one skilled in the art of compression. In particular, video encoder 100 may be implemented as an integrated circuit (IC).

Decoding

Figure 2:
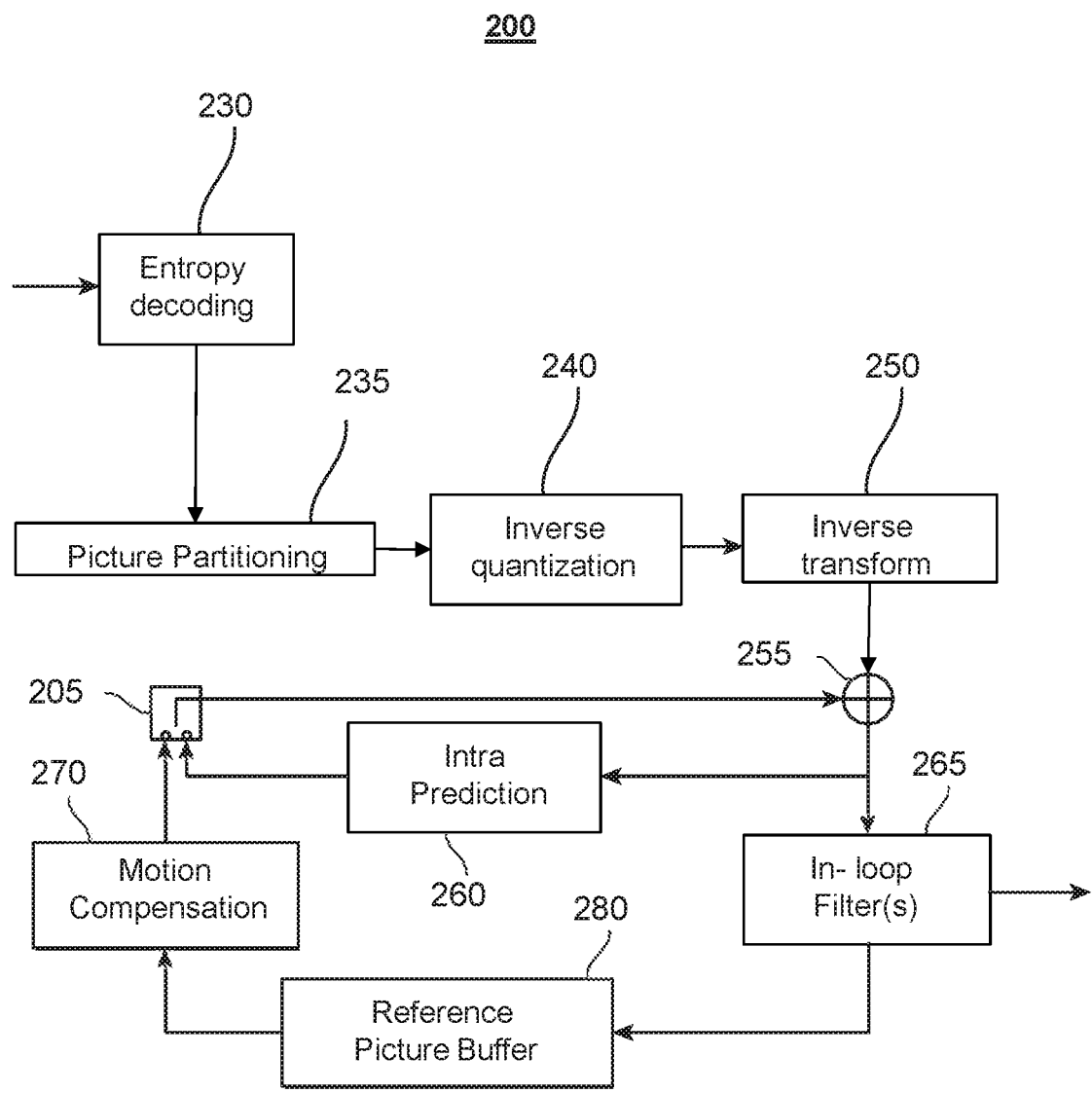
FIG. 2 illustrates a simplified block diagram of an exemplary decoder in accordance with at least one embodiment.

FIG. 2 illustrates a simplified block diagram of an exemplary decoder 200 in accordance with at least one embodiment.

The decoder 200 may be included in a receiver in a communication system.

The decoder 200 generally performs a decoding pass reciprocal to the encoding pass performed by the encoder 100 as described in FIG. 1, although not all operations in the decoder are inverse operations of the encoding process (for example intra- and inter-prediction).

In particular the input of the decoder 200 includes a video bitstream, which may be generated by the encoder 100.

The video bitstream is first entropy decoded (module 230) to obtain, for example, transform coefficients, motion vectors MV, picture partitioning information, possibly prediction mode flag, syntax elements and other decoding data.

For example, in HEVC, the picture partitioning information indicates the size of the CTUs, and a manner a CTU is split into CUs. The decoder may therefore divide (235) the picture into CTUs, and each CTU into CUs, according to the picture partitioning information.

The transform coefficients are de-quantized (module 240) and inverse transformed (module 250) to decode prediction residual blocks. The decoded prediction residual blocks are then combined (module 255) with prediction blocks (also known as a predictor) to obtain decoded/reconstructed blocks.

A prediction block may be obtained (module 205) from intra-prediction (module 260) or motion-compensated prediction (that is, inter-prediction) (module 270) depending, possibly, on prediction mode flag. An in-loop filter (module 265) may be applied to the reconstructed picture. The in-loop filter may comprise a deblocking filter and/or a SAO filter. The filtered picture is stored in a reference picture buffer 280.

The modules of decoder 200 may be implemented in software and executed by a processor or may be implemented using circuit components well-known by one skilled in the art of compression. In particular, decoder 200 may be implemented as an integrated circuit (IC), alone or combined with encoder 100 as a codec.

The present embodiments are directed to provide a mechanism to improve the High Level Syntax (HLS) for block-based video coding by using less bits than current syntax used in legacy block-based video compression standards.

HLS is a signaling mechanism that enables bitstream interoperability points defined by other parties than MPEG or ITU, such as for instance DVB, ATSC, 3GPP. For example, in the VVC draft standard (B. Bross, J. Chen, S. Liu, "Versatile Video Coding (Draft 4)," in JVET document JVET-N1001, 14th Meeting: Geneva, CH, 19-27 Mar. 2019), HLS constraint flags allow for controlling the activation of coding tools in the VVC decoder. The HLS constraint flags are grouped into a syntax element "general_constraint_info( )" included in the SPS (sequence parameter set) and/or the profile and level, VPS (video parameters set) and (decoding parameter set) DPS bitstream part as depicted in FIG. 3. The constraint flags indicate properties that cannot be violated in the entire video bitstream. When a constraint flag is set in the SPS (or similar) syntax structure, a decoder can safely assume that the tool will not be used in the video bitstream.

The current syntax for coding constraint flags uses significantly high number of bits which may jeopardize the video bitstream coding efficiency. Indeed, this information may be repeated in several location in the video bitstream because it is present in the SPS which is sent at each Random Access Point (RAP) typically, and it could be repeated in other places such as the Decoder Parameter Set (DPS) too.

Another example of HLS is the high-level syntax that groups non-coded picture parts such as sequence, picture, slice or tile headers, Supplemental Enhancement Information (SEI), Video Usability Information (VUI) and excludes coded macro-blocks, CTUs or CUs. In the following, we will call "HLS partitioning" the HLS that allows grouping information related to subsets of macro-blocks, CTUs or CUs into pictures, slices, tiles, group of slices or bricks headers for example.

Figure 4:
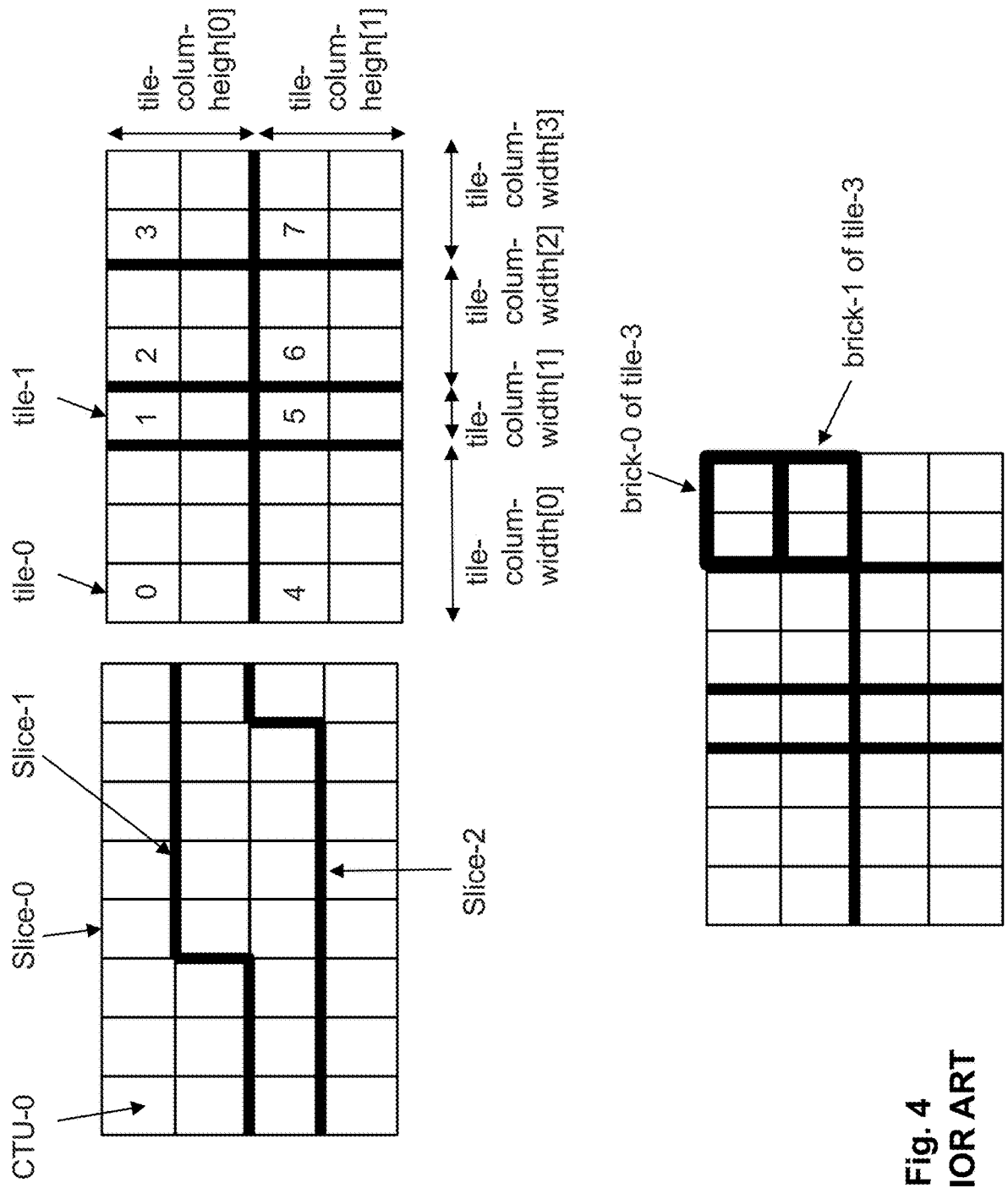
FIG. 4 illustrates examples of tiles slices slice groups, tiles and bricks in accordance with prior art.

In AVC and HEVC video coding standards, the high-level partitioning is carried out using slices (consecutive CTUs in raster scan) or tiles (uniform or non-uniform tile grid). In the VVC draft standard, the high-level partitioning is carried out using tiles and possibly bricks which partitions the tiles into rectangular sub-regions vertically (FIG. 4). In case of non-uniform tile spacing, the tiles are distributed according to a non-uniform grid (top-right). In this case, in HLS, one may signal the "tile-column-width" and "tile-column-height" values (FIG. 5).

Figures 6, 7:
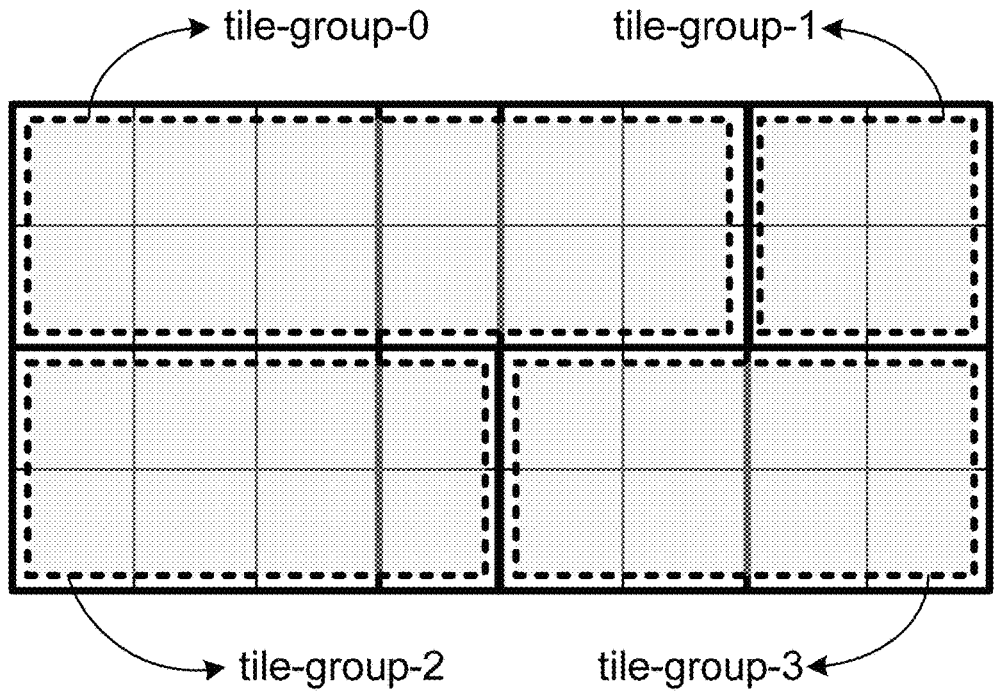
FIGS. 6-7 illustrate examples of tile-groups in accordance with prior art.

Several tiles can be grouped into one "tile-group". For defining the tiles-groups, the tiles are implicitly labelled in raster scan order as depicted in FIG. 6, the top-left tile index (top_left_tile_idx[i]) and the bottom-right tile index (bottom_right_tile_idx[i]) are signaled in the HLS for each tile-group "i". For example, the 8 tiles (top-right in FIG. 4) have been grouped into 4 "tiles-groups" (FIG. 6). For example, a first tiles-group 0 is composed of tiles 0, 1 and 2 with top_left_tile_idx[0]=0, bottom_right_tile_idx[0]=2 and bottom_right_tile_idx_delta[0]=2 (bottom_right_tile_idx_delta[i]=bottom_right_top_left_tile_idx[i]−top_left_tile_idx[i]) (FIG. 7).

Figure 7A:
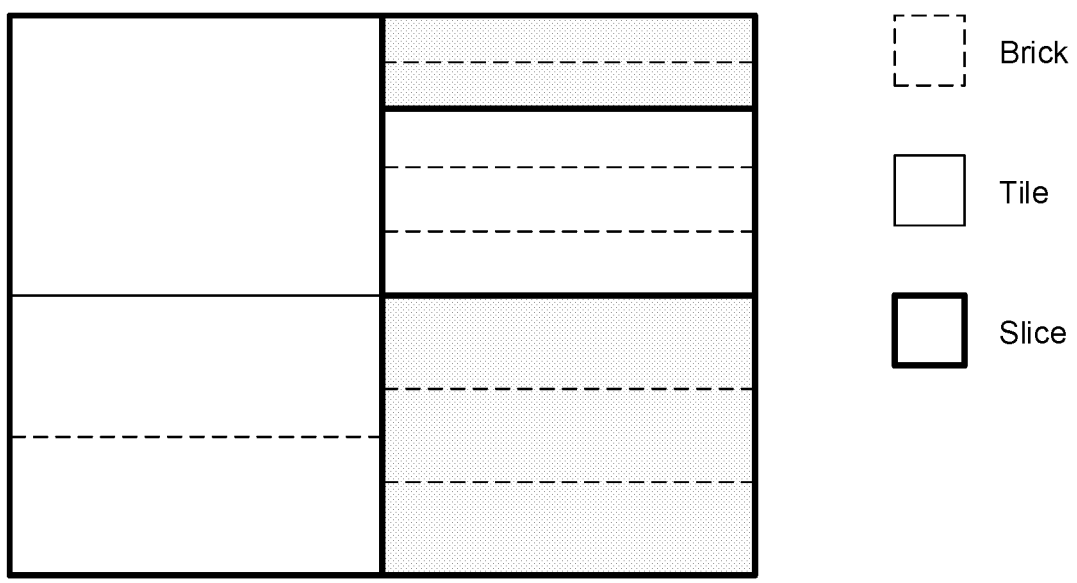
FIG. 7a illustrates example of tiles, slices and bricks in accordance with at least one embodiment.

In a variant, a tile may be divided into one or more bricks. Each of which consisting of a number of CTUs rows within the tile. A slice may contain either a number of tiles or a number of bricks. Two modes of slices may be supported, namely the raster-scan slice mode and the rectangular slice mode. In the raster-scan slice mode, a slice may contain a sequence of tiles in a tile raster scan of a picture. In the rectangular slice mode, a slice may contain a number of bricks of a picture that collectively form a rectangular region of the picture. The bricks within a rectangular slice may be in the order of brick raster scan of the slice. The bricks may be implicitly labelled in raster scan order, the top-left brick index (top_left_brick_idx[i]) and the bottom-right brick index (bottom_right_brick_idx[i]) may be signaled in the HLS for each slice "i". For example, the first slice 0 (left in FIG. 7a) contains 2 tiles and 3 bricks. It is composed of "brick_idx" 0, 1 and 2 with top_left_brick_idx[0]=0, bottom_right_brick_idx[0]=2 and bottom_right_brick_idx_delta[0]=2 (bottom_right_brick_idx_delta[i]=bottom_right_brick_idx[i]−top_left_brick_idx[ ]). The second slice 1 (top-right in FIG. 7a) contains 2 bricks. It is composed of "brick_idx" 3 and 4 with top_left_brick_idx[0]=3, bottom_ right_brick_idx[0]=4 and bottom_right_brick_idx_delta[0]=1. The third slice 2 (mid-right in FIG. 7a) contains 3 bricks. It is composed of "brick_idx" 5, 6 and 7 with top_left_brick_idx[0]=5, bottom_right_brick_idx[0]=7 and bottom_right_brick_idx_delta[0]=2. The fourth slice 3 (bottom-right in FIG. 7a) contains 3 bricks. It is composed of "brick_idx" 8, 9 and 10 with top_left_brick_idx[0]=8, bottom_right_brick_idx[0]=10 and bottom_right_brick_idx_delta[0]=2

Note that the naming of these tiles, bricks and group-of-tiles may change, but the basics remains.

In a video bitstream, the slice headers, tile headers, etc. . . . are repeated at least once for each coded picture, even if most of the time they share same values.

The present embodiments signal decoding data in a video bitstream by using a syntax element indicating whether the decoding data are coded in the video bitstream or inferred from previous data of the video bitstream.

Figure 8:
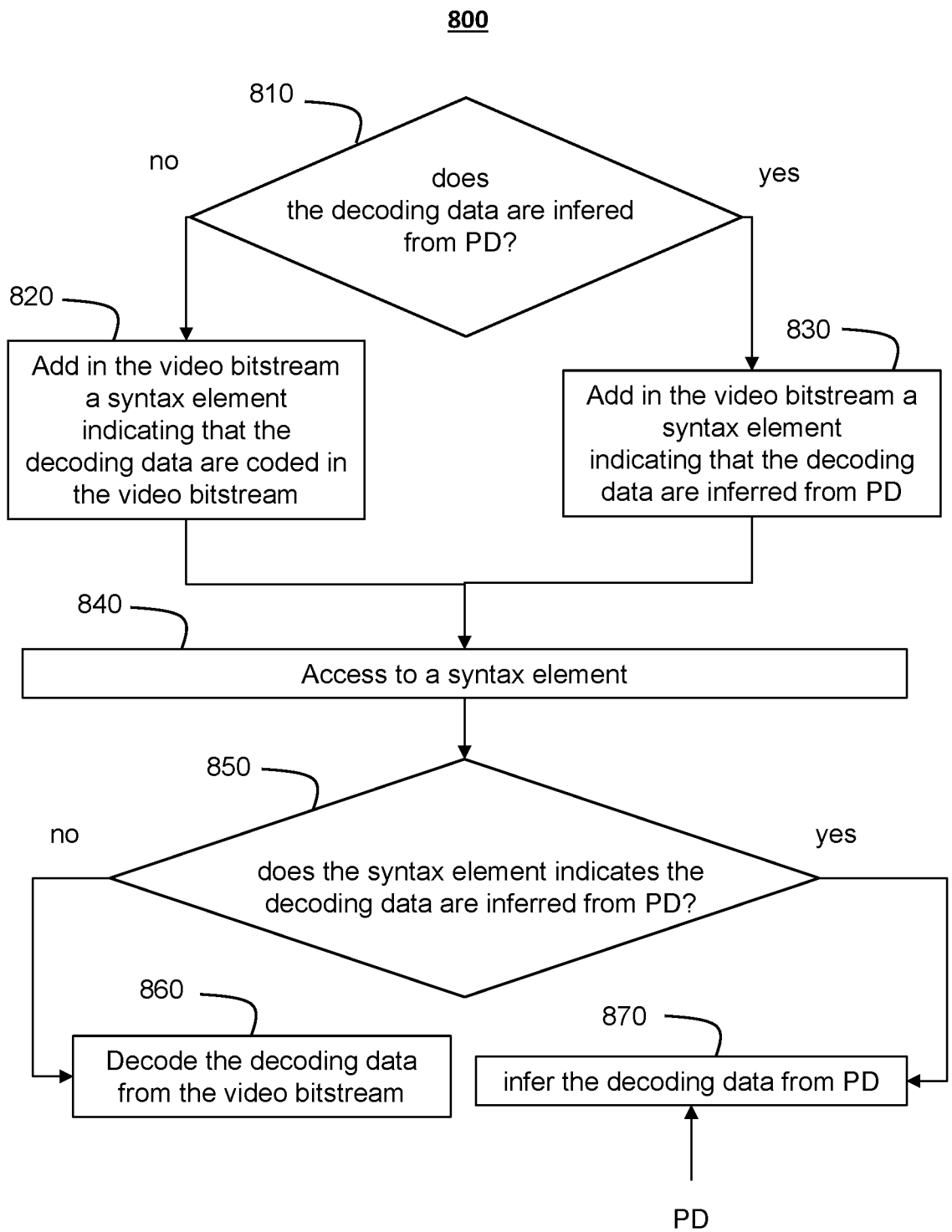
FIG. 8 illustrates a flowchart of the method 800 for signaling a set of decoding data in accordance with at least one embodiment.

FIG. 8 illustrates a flowchart of the method 800 for signaling a set of decoding data in accordance with at least one embodiment.

In step 810, the method may check whether the decoded data of the set are explicitly coded in a video bitstream or inferred from previous data PD of the video bitstream. A syntax element F may be added in the video bitstream. If the decoded data of the set are inferred from previous data PD then (step 830), the syntax element F indicates that the decoding data of the set are inferred from previous data PD. If the decoding data of the set are explicitly coded in the video bitstream, then (step 820) the syntax element F indicates that the decoding data of the set are explicitly coded in the video bitstream.

In step 840, the method may access to a syntax element F from the video bitstream.

In step 850, the method may check whether the syntax element F indicates that the decoding data of a set of decoding data are inferred from previous data PD of the video bitstream. In that case (step 870), the decoding data of the set are inferred from previous data PD. If the syntax element F indicates that the decoding data of the set are explicitly coded in the video bitstream, then (step 860), the decoding data of the set are explicitly decoded from the video bitstream.

Figure 9:
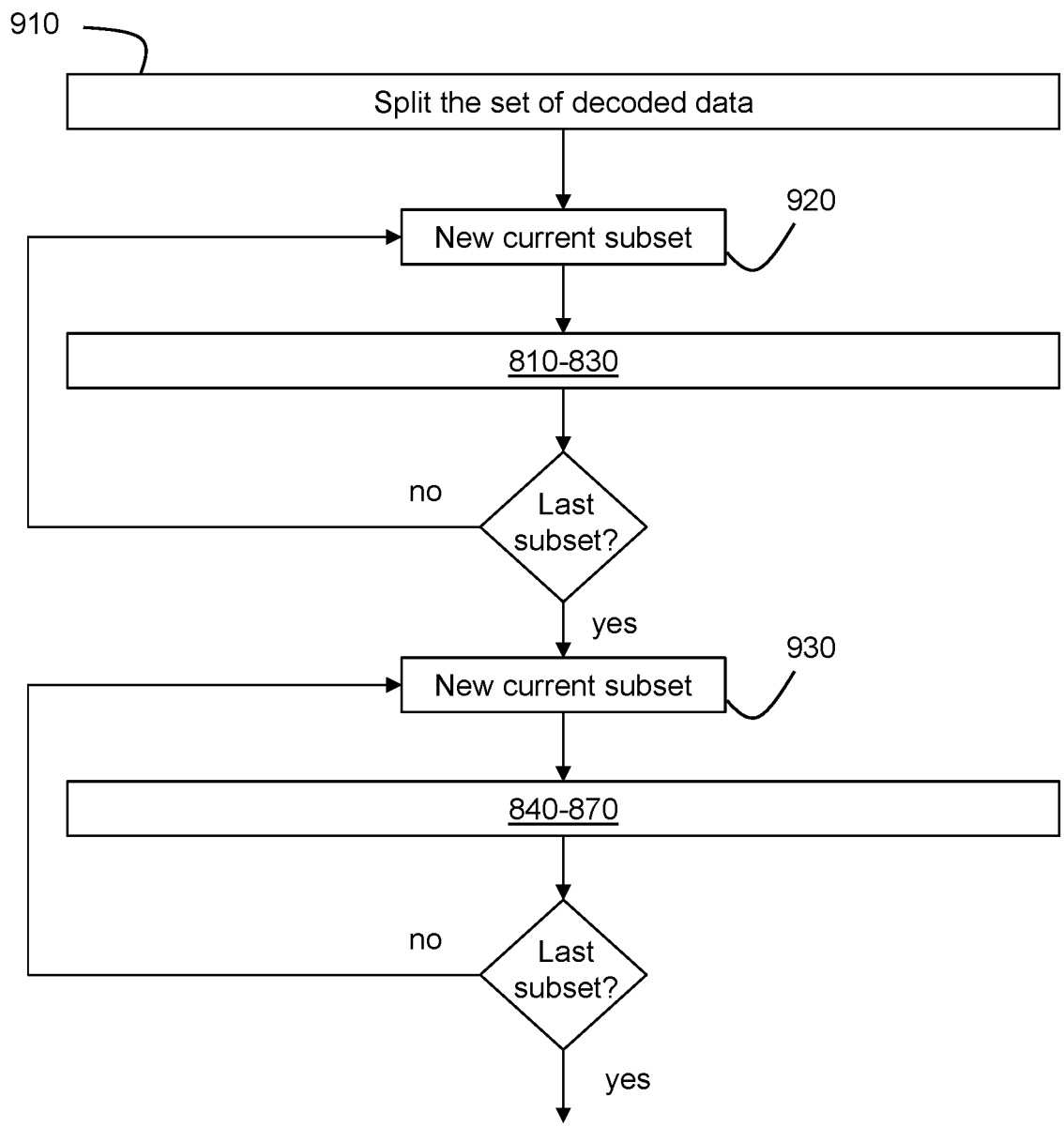
FIG. 9 illustrates a flowchart of a variant of the method of FIG. 8 or 9 in accordance with at least one embodiment.

FIG. 9 illustrates a flowchart of a variant of the method of FIG. 8 when the syntax element indicates that the decoding data of the set is explicitly coded in the video bitstream.

Figure 10:
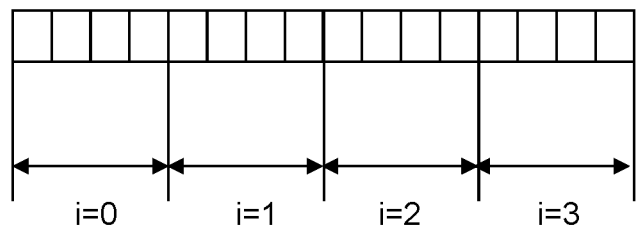
FIG. 10 illustrates an example of splitting a set into subsets in accordance with at least one embodiment.

In step 910, the set of decoding data is split into subsets as illustrated in FIG. 10 in which the set of decoding data is split into 4 subsets i.

Step 910 is followed by iterations of steps 810-830 of the method 800 (FIG. 8). At each iteration, a current subset i of decoding data is considered (step 920) as input of step 810 in the course of which the method may check whether the decoded data of the current subset i are explicitly coded in a video bitstream or inferred from previous data PDi of the video bitstream. A syntax element Fi may be added in the video bitstream. If the decoded data of the current subset i are inferred from previous data PDi then (step 830), the syntax element Fi indicates that the decoding data of the current subset i are inferred from previous data PDi. If the decoding data of the current subset i are explicitly coded in the video bitstream, then (step 820) the syntax element Fi indicates that the decoding data of the subset i are explicitly coded in the video bitstream.

When all the subsets i are considered, steps 840-870 of the method 800 (FIG. 8) iterate. At each iteration, a current subset i of decoding data is considered (step 930) as input of step 840 in the course of which the method may access to a syntax element Fi for a current subset i from the video bitstream.

In step 850, the method may check whether the syntax element Fi indicates that the decoding data of a subset i of decoding data are inferred from previous data PDi of the video bitstream. In that case (step 870), the decoding data of the subset i are inferred from previous data PDi of the video bitstream. If the syntax element Fi indicates that the decoding data of the subset i are explicitly coded in the video bitstream, then (step 860), the decoding data of the subset i are explicitly decoded from the video bitstream.

The index i (Fi, FDi) indicates that the syntax element and previous data are dedicated to the decoding data of a subset i. Some Fi and/or FDi may be the same.

FIG. 10 illustrates the use of the method 800 when a set of decoding data is split into subsets.

In a variant, the method 800 may be used when a set of decoding data is recursively split as follows creating multiple hierarchical levels. A subset at the hierarchical level L is split into subsets at a hierarchical level (L+1) when a syntax element indicates that the decoding data of the subset at the hierarchical level L are explicitly coded in the video bitstream (step 830). The recursive splitting stops when a condition is fulfilled such as, for example, a maximum number of hierarchical levels or a minimum cardinality of a subset.

When all subsets of decoding data of a hierarchical level L have been considered, the method 900 applies iteratively on the subsets of the new hierarchical level (L+1) (if exists).

Figure 11:
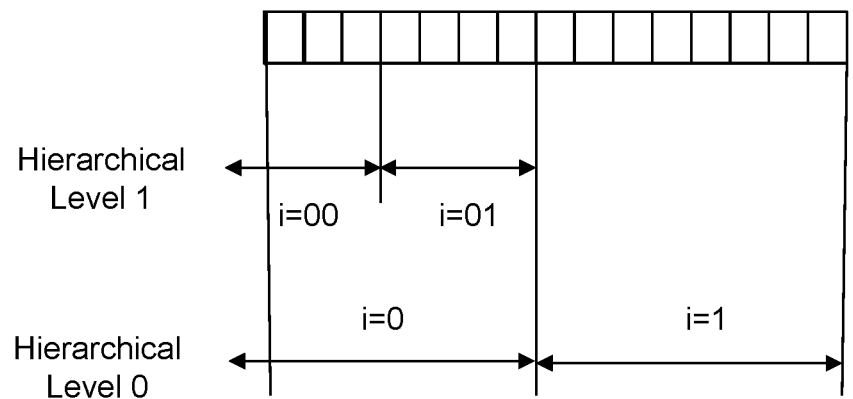
FIG. 11 illustrates an example of a two hierarchical levels splitting of a set of 16 decoding data.

FIG. 11 illustrates an example of a two hierarchical levels splitting of a set of 16 decoding data.

At a first hierarchical level 0, the set is first split into two subsets (i=0 and i=1) of 8 decoding data (810). At step 820, a syntax element is added to the bitstream to indicate that the subset of decoding (i=0) data is split, for example, into 2 sub-subsets (i=00 and i=01). Another syntax element is also added to the video bitstream to indicate that the decoding data of the second subset (i=1) are inferred from previous data of the video bitstream (step 830) and the second subset (i=1) is not split.

At a second hierarchical level 1, another syntax element is also added to the video bitstream to indicate that the decoding data of the sub-subset (i=00) are inferred from previous data of the video bitstream (step 830) and the sub-subset (i=00) is not split. Another syntax element is also added to the video bitstream to indicate that the decoding data of the sub-subset (i=01) are inferred from previous data of the video bitstream (step 830) and the sub-subset (i=01) is not split.

In one embodiment, the set of decoding data may comprise constraint-flags controlling the activation of coding tools. A syntax element F (or Fi) may then indicate whether the constraint-flags of the set (or a subset of the set) are explicitly coded in the video bitstream or inferred from previous data PD of the video bitstream.

FIG. 12 illustrates an example of a HLS element "general_constraint_info" in accordance with at least one embodiment.

The syntax element "general_constraint_info" comprises constraint-flags that are grouped together under a syntax element "use_default_constraint_flag" (syntax element F or Fi). This syntax element "use_default_constraint_flag" may be a flag that is false when these constraint-flags are explicitly coded in the video bitstream (steps 820), or explicitly decoded from the video bitstream (step 860), or true when these constraint-flags are all inferred from previous data PD of the video bitstream (step 830, 870).

Note that when the constraint-flags are inferred other constraint-flags (not shown here) may be explicitly coded/decoded.

In a variant, the previous data PD is a single binary value (false or true) and all the inferred constraint-flag values equal this single binary value FD.

In a variant, the previous data PD depends on a decoding profile, a level and/or at least one decoding parameter of the video bitstream. For example, for "high profile" all the inferred constraint-flag values are equal to false (all tools possibly enabled) and for "low profile" some pre-determined subset of constraint-flag values are inferred to true (tools disabled) and the other constraint-flag values are inferred to false (tools possibly enabled).

In a variant, the status of the syntax element F (or Fi) determines whether decoding parameters are present or not in the video bitstream.

For example, the set of syntax elements "profile_tier_level( )" of FIG. 13 comprises constraint-flags "general_constraint_info( )" under the syntax element "use_default_constraint-flag" (syntax element F or Fi). In FIG. 13, if the syntax element "use_default_constraint_flag" is true then the set of syntax elements "general_constraint_info( )" is explictly coded in the video bitstream.

If "use_default_constraint flag" is false, this set of syntax elements is not present and the syntax elements are inferred.

In a variant illustrated in FIG. 12, the syntax element "use_default_constraint_flag" is coded within "general_constraint_info( )" and not in "profile_tier_level( )". If the syntax element "use_default_constraint_flag" is false then a set of syntax elements indicating whether some tools are possibly enabled or disabled in the bitstream are present (explictly coded) in the video bitstream and otherwise this set of syntax elements is not present and the syntax elements are inferred.

In block-based video codec specifications, the video bitstream is partitioned into coded video sequences (CVS) which contains one or more access units (AUs) in decoding order. One AU contains exactly one coded picture.

Figure 14:
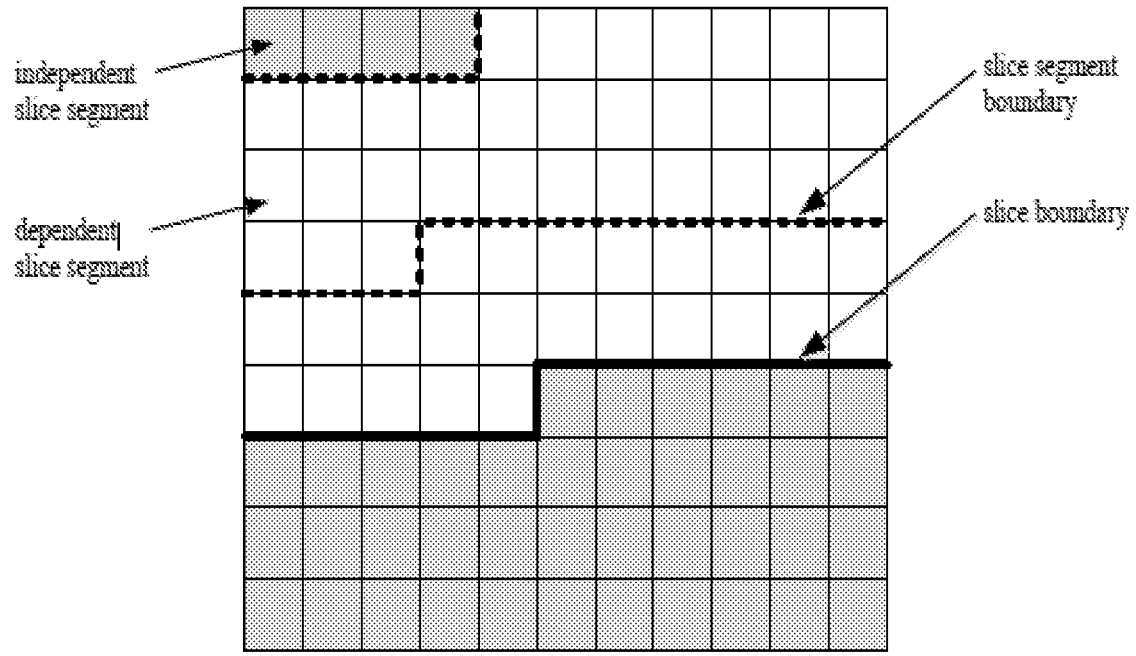
FIGS. 14-15 illustrates an example of slice segments in accordance with prior art.
Figure 15:
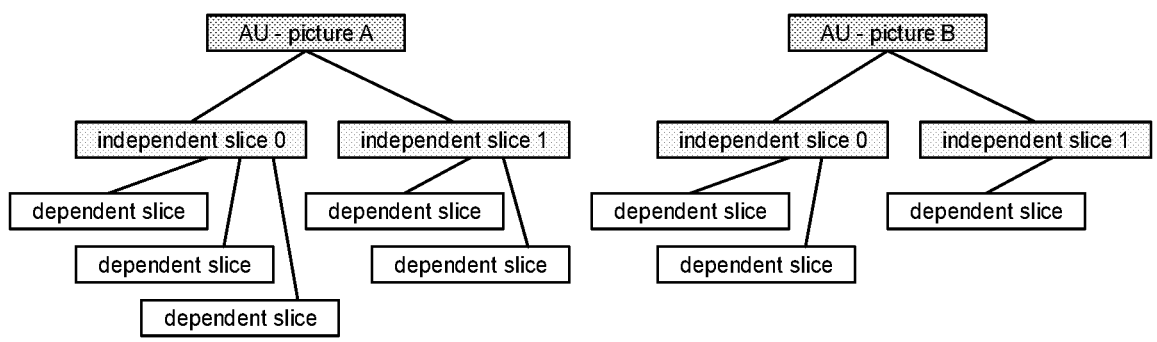

For example, in HEVC, the AUs are partitioned into slices. Some decoding data in different slice headers (or tile headers, or tile group headers) are the same for several slices. For that reason, in HEVC, the first slice in a picture is necessary independent while the subsequent slices may be dependent, as depicted in FIG. 14. The dependent slice headers share common decoding data with the first independent slice in a same picture (FIG. 15).

Figure 16:
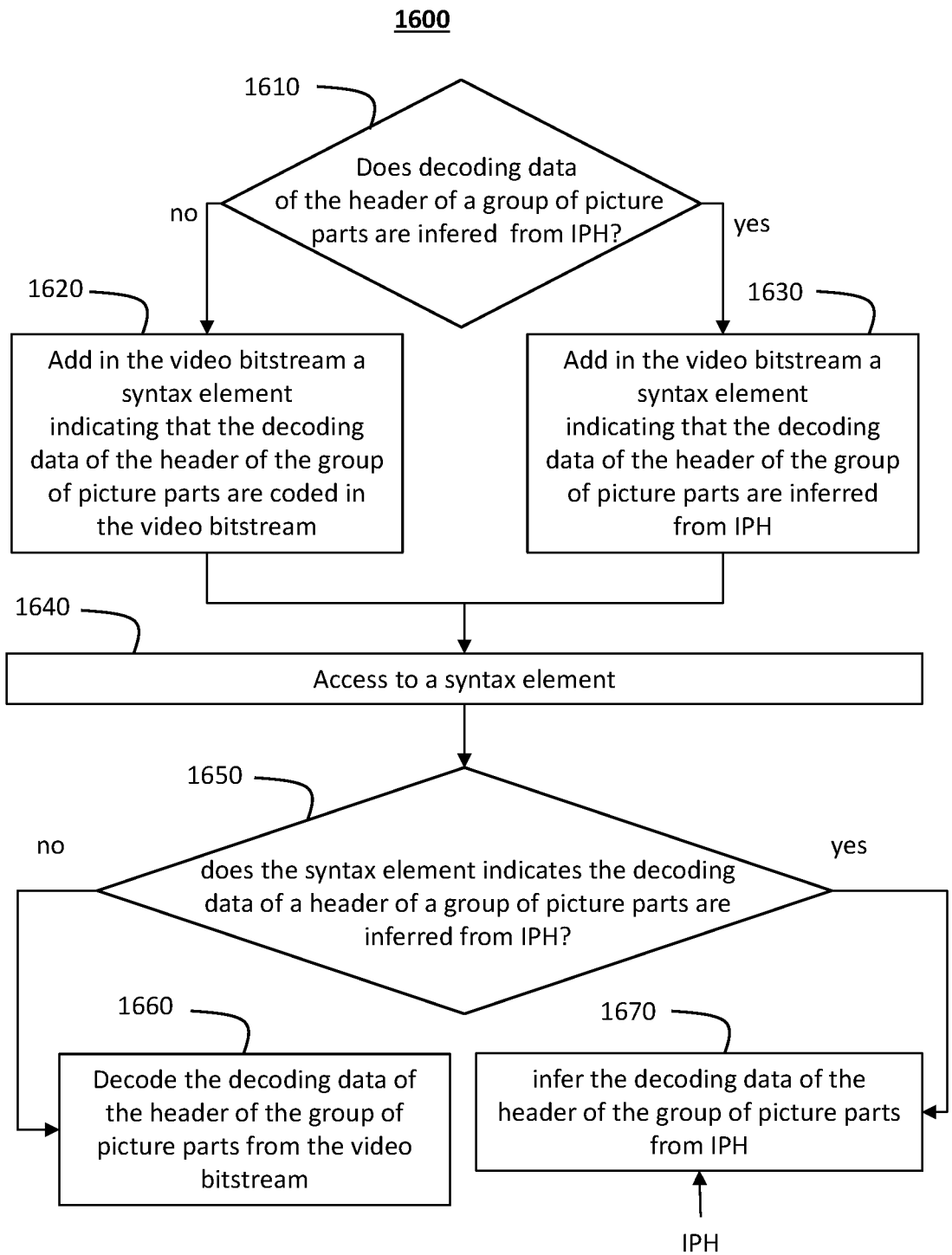
FIG. 16 illustrates a flowchart 1600 of an embodiment of the method 800 or 900 when the set of decoding data comprises decoding data of a header of a group of picture parts.

FIG. 16 illustrates a flowchart 1600 of an embodiment of the method 800 or 900 when the set of decoding data comprises decoding data of a header of a group of picture parts such as, for example, a slice header of a picture and/or a tile header and/or a tile-group header. In HEVC, the slices have headers and may contain tiles, but the tiles have no headers. In other codecs the slices are replaced by tiles and the tiles have headers.

In HEVC, examples of such decoding may comprise at least one of the following decoding data (slice header):
  post filters flags such as (slice_sao_luma_flag, slice_sao_chroma_flag, slice_alf_luma_flag, slice_alf_chroma_flag).
  reference pictures list,
  weighted_pred/bipred_flag: WP (Weighted Prediction) enabled or not in the slice,
  partitioning into slices, tiles or tile-groups, bricks (e.g. num_bricks_in_slice_minus1)
  Slice_type: I (intra only), P (unidirectional) or B (bi-prediction),
  pic_output_flag: whether the current picture will be output or not,
  colour_plane_flag: whether color channels are coded separately or not,
  POC: Picture Order Count,
  long-term-ref info: long-term reference pictures indexes and POCs
  slice_temporal_mvp_enabled_flag: temporal motion vectors prediction tool enabled or not,
  long-term-ref info (POC)
  slice_qp_delta: QP (Quantization Parameter) start diff with init_QP specified in PPS,
  deblocking filter parameters (beta,tc).

In other codecs, these data may be included in the tile header. For the following, we consider the picture is partitioned into regions (or picture parts), one region being composed of several blocks (e.g. CTUs or macro-blocks). The region may be a slice, a tile, a tile group or a brick for example, depending on the partitioning topology of the codec. Some of them may be associated with an header containing information related to the blocks that compose the region.

In step 1610 (embodiment of step 810 of FIG. 8), the method may check whether decoding data of a header of a group of picture parts (or regions) are explicitly coded in the video bitstream or inferred from previous data IPH ("inter_picture-header") of the video bitstream. A syntax element F (or Fi) denoted "infer_from_inter_picture_header_flag", may be added in the video bitstream. If the decoding data of the header of the group of picture parts are inferred from previous data IPH, then, in step 1630 (embodiment of step 830 of FIG. 8), the syntax element F (or Fi) indicates that the decoding data of the header of the group of picture parts are inferred from decoding data of another header of a group of picture parts (previous data IPH). If the decoding data of the header of the group of picture parts are explicitly coded in the video bitstream, in step 1520 (embodiment of step 820 of FIG. 8), the syntax element F (or Fi) may indicate that the decoding data of the header of the group of picture parts are explicitly coded in the video bitstream.

The previous data IPH groups decoding data of, for example, multiple slice headers of a same picture and/or multiple tile headers and/or multiple tile-group headers that are common.

Inferring common decoding data defined in headers of typically AUs, CTUs/CUs, tiles or tiles groups reduces the bandwidth for transmitting a video.

For example, in each AU, and possibly in each slice in this AU, the syntax element "infer_from_inter_picture_header_flag" may indicate whether these decoding data are explicitly defined in the AU (in each slice in this AU), for example in a slice header, tile or tile-group header, or whether they are inferred from the previous data IPH that may thus be shared by several groups of picture parts of, possibly, several pictures.

In step 1640 (embodiment of step 840 of FIG. 8), the method may access to a syntax element F (or Fi) from the video bitstream.

In step 1650 (embodiment of step 850 of FIG. 8), the method may check whether the syntax element F (or Fi) indicates that the decoding data of a header of a group of picture parts are inferred from previous data IPH in the video bitstream. Then, in step 1670 (embodiment of step 870 of FIG. 8), the decoding data of the header of the group of picture parts are inferred from previous data IPH. If the syntax element F (or Fi) indicates that the decoding data of the header of the group of picture parts are coded in the video bitstream, then in step 1660 (embodiment of step 860 of FIG. 8), the decoding data of the header of the group of picture parts are explicitly decoded from the video bitstream.

Advantageously, a previous data IPH is situated in a bitstream associated with a GOP (Group Of Pictures) after a RAP syntax element and before AU syntax elements relative to the RAP. Decoding data of the AU syntax elements may then be inferred from the previous data IPH as illustrated in FIG. 17.

In one embodiment of the method 1600, a list of reference pictures (decoding data of a header of a group of picture parts) may be inferred from a GOP structure and a number of reference frames (previous data IPH).

In one embodiment of the method 1600, slice parameters (decoding data of a header of a group of picture parts) (for example slice type) may be inferred from a GOP structure and a decoded picture order (previous data IPH).

In one embodiment, decoding data of a tiles group controlling the coding/decoding of tiles groups may be inferred from decoding data of another tiles group (previous data IPH) of the video bitstream.

Inferring tile-group information from previous data in the video bitstream reduces the bandwidth for transmitting a picture.

In a variant, the tiles group comprises a number of tiles of a pictures or a slice (decoding data denoted "num-tiles"). A syntax element (F, Fi, . . . ) may then indicate whether the number of tiles i is coded in the video bitstream or inferred from previous data IPH representative of a number of tiles per column (denoted "num_tile_columns_minus1") and a number of tiles per row (denoted "num_tile_rows_minus1").

For example, "num-tiles" is inferred from "num_tile_columns_minus1" and "num_tile_rows_minus1" as follows:

num_tiles=(num_tile_columns_minus1+1)×(num_tile_rows_minus1+1).

In an embodiment, the tiles group further comprises a "bottom-right-tile-idx" value or a "bottom-right-tile-idx-delta" value of the last tile-group of a picture.

The bottom-right-tile-idx value or a bottom-right-tile-idx-delta value (decoding data) of the last tile-group (decoding data) may be inferred from the number of tiles (previous data of the video bitstream) as follows:

bottom_right_tile_idx[num_tile_groups_in_pic_minus1]=num_tile-1 bottom_right_tile_idx_delta [num_tile_groups_in_pic_minus1]=num_tile-1-top_left_tile_idx [num_tile_groups_in_pic_minus1].

One of the advantage, illustrated in FIG. 18, of this embodiment is to save the bits for coding "bottom_right_tile_idx_delta[num_tile_groups_in_pic_minus1]" in a syntax element "pic_parameter_set_rbsp".

Similarly, the number of bricks in a picture (NumBricksInPic) may be inferred from previous data IPH. In case of rectangular slice mode, the slices may further comprise a "bottom-right-brick-idx" value or a "bottom-right-brick-idx-delta" value of the slice of a picture.

The bottom-right-brick-idx value or a bottom-right-brick-idx-delta value (decoding data) of the last slice (decoding data) may be inferred from the number of bricks (previous data of the video bitstream) as follows:

bottom_right_brick_idx[num_slices_in_pic_minus1]= NumBricksInPic-1 bottom_right_brick_idx_delta[num_slices_in_pic_minus1]=NumBricksInPic-1-top_left_brick_idx [num_slices_in_pic_minus1]

One of the advantage, of this embodiment is to save the bits for coding "bottom_right_brick_idx_delta[num_slices_in_pic_minus1]" in a syntax element "pic_parameter_set_rbsp".

Figure 19:
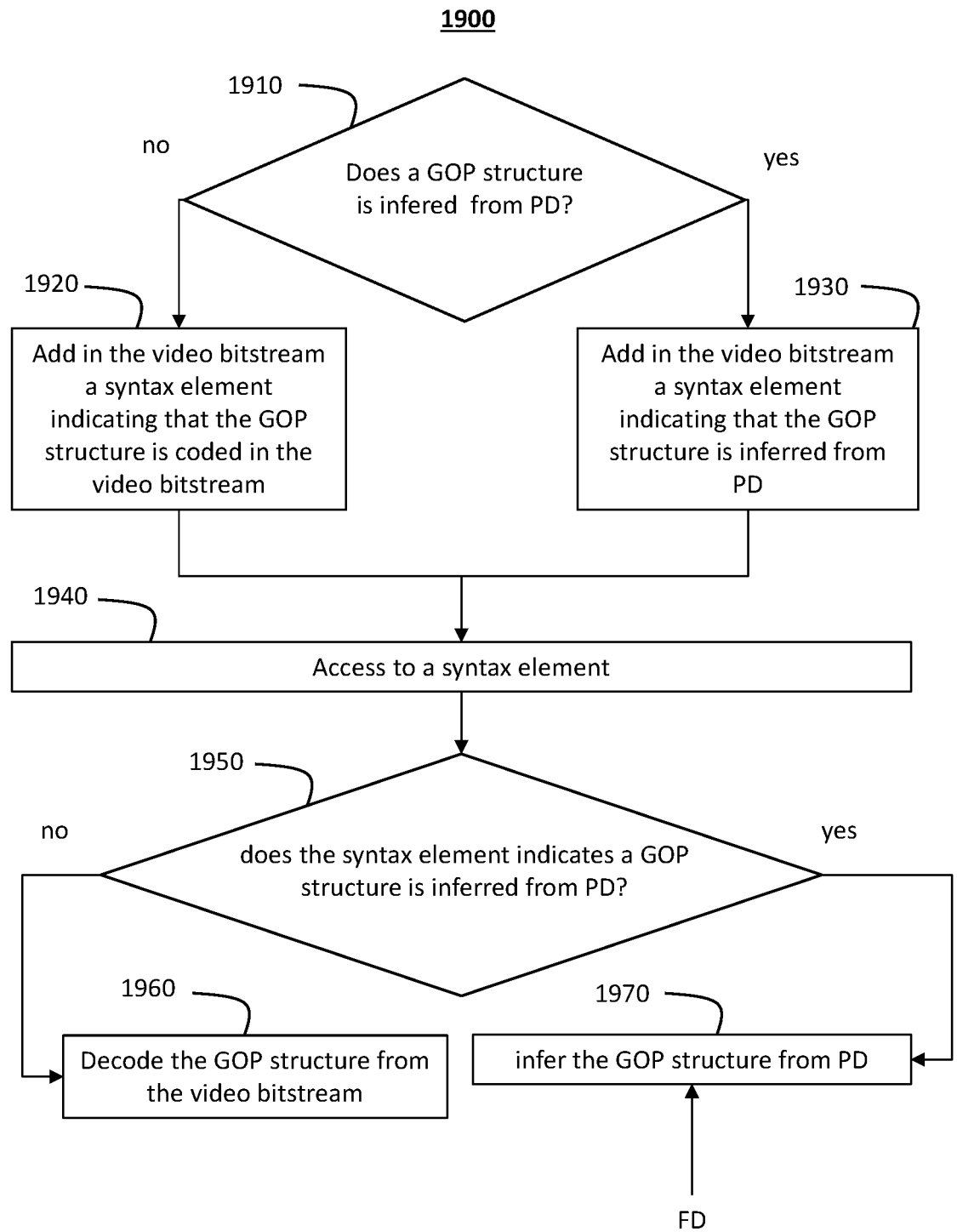
FIG. 19 illustrates a flowchart 1900 of an embodiment of the method 800 or 900 when the set of decoding data comprises the structure of Group of Pictures.

FIG. 19 illustrates a flowchart 1900 of an embodiment of the method 800 or 900 when the set of decoding data comprises the structure of Group of Pictures (GOP).

In step 1910 (embodiment of step 810 of FIG. 8), the method may check whether a GOP structure is explicitly coded in the video bitstream or inferred from previous data PD in the video bitstream. A syntax element F (or Fi) denoted "GOP_structure_indicator", may be added in the video bitstream. If the GOP structure is inferred from previous data PD, then, in step 1930 (embodiment of step 830 of FIG. 8), the syntax element F (or Fi) indicates that the GOP structure is inferred from previous data PD. If the GOP structure is explicitly coded in the video bitstream, in step 1920 (embodiment of step 820 of FIG. 8), the syntax element F (or Fi) may indicate that the GOP structure is explicitly coded in the video bitstream.

In a variant, when the GOP structure is inferred from previous data PD in the video bitstream, the syntax element F is not added in the video bitstream.

Inferring GOP structures reduces the bandwidth for transmitting a video.

In step 1940 (embodiment of step 830 of FIG. 8), the method may access to a syntax element F (or Fi) from the video bitstream.

In a variant, the method checks whether a syntax element F (or Fi) is present in the video bitstream.

In step 1950 (embodiment of step 850 of FIG. 8), the method may check whether the syntax element F (or Fi) indicates that a GOP structure is inferred from previous data PD of the video bitstream, or if the syntax element F (or Fi) is not present in the video bitstream in accordance with a variant.

Then, in step 1970 (embodiment of step 870 of FIG. 8), the GOP structure is inferred from previous data PD. If the syntax element F (or Fi) indicates that the GOP structure is explicitly coded in the video bitstream, or if the syntax element F (or Fi) is present in the video bitstream in accordance with a variant, then in step 1960 (embodiment of step 860 of FIG. 8), the GOP structure is explicitly decoded from the video bitstream.

In one embodiment, the syntax element F (or Fi) may signal a pre-defined GOP structure index of a set of pre-defined GOP structures.

Examples of pre-defined GOP structures may be Random-Access (RA: hierarchical coding), Low-Delay-B (LB), Low-Delay-P (LP) as illustrated in FIG. 20.

In a variant of the method 1900 illustrated in FIG. 20, an additional syntax element such as the GOP length may be used to precise which of the pre-defined GOP structure is signaled.

In one embodiment, the previous data PD comprises some first decoded pictures in the GOP and the set of pre-defined GOP structures.

For example, based on pre-defined GOP structures of FIG. 20, if the first decoded picture POCs are 0-16-8-4, the inferred GOP structure relates to the pre-defined GOP structure with the index "1".

Figure 21:
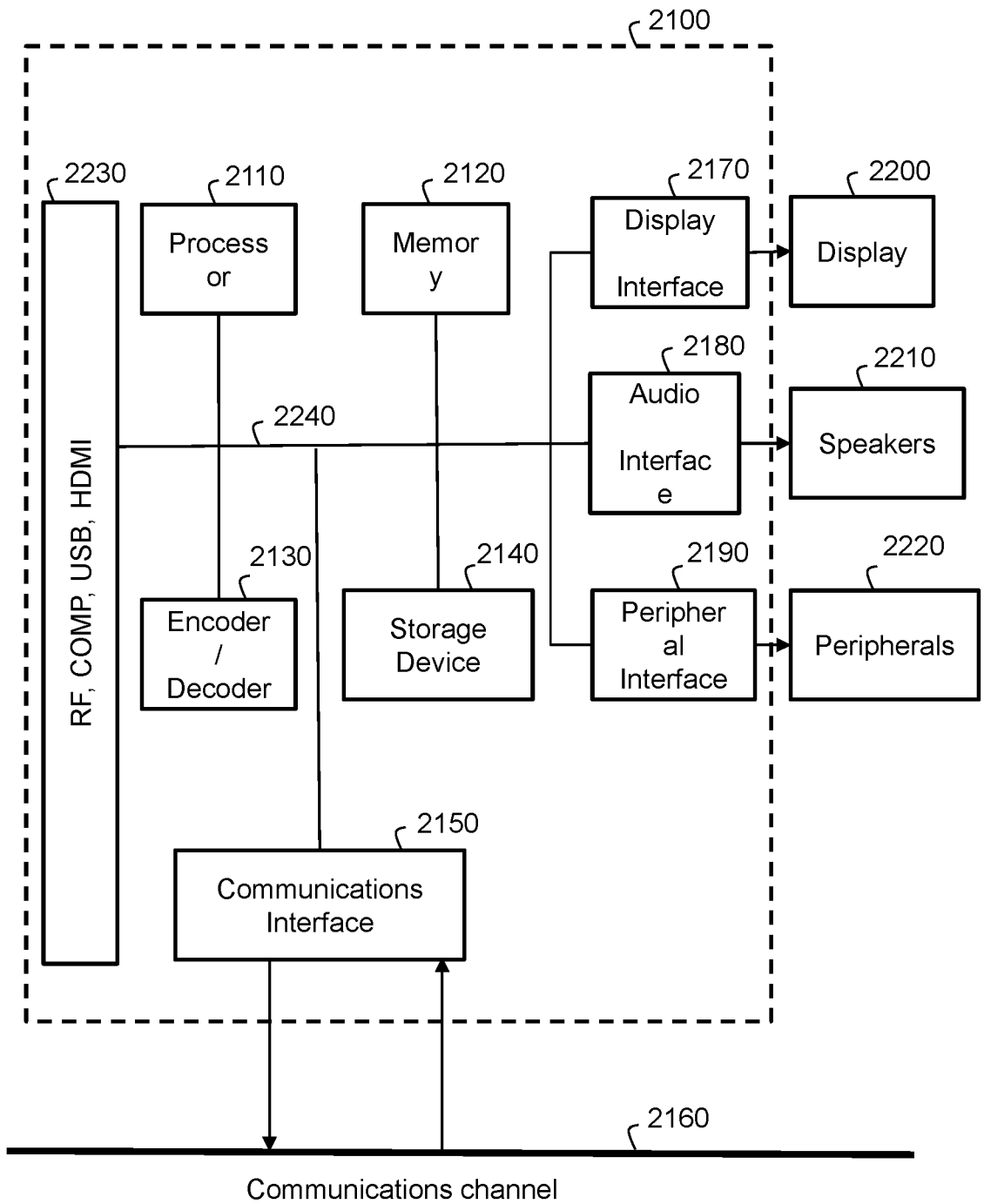
FIG. 21 illustrates a block diagram of a computing environment within which aspects of the present disclosure can be implemented and executed.

FIG. 21 illustrates a block diagram of an example of a system in which various aspects and embodiments are implemented.

System 2100 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2100, singly or in combination, can be embodied in a single integrated circuit (IC), multiple ICs, and/or discrete components. For example, in at least one embodiment, the processing and encoder/decoder elements of system 2100 are distributed across multiple ICs and/or discrete components. In various embodiments, the system 2100 is communicatively coupled to one or more other systems, or other electronic devices, via, for example, a communications bus or through dedicated input and/or output ports. In various embodiments, the system 2100 is configured to implement one or more of the aspects described in this document.

The system 2100 includes at least one processor 2110 configured to execute instructions loaded therein for implementing, for example, the various aspects described in this document. Processor 2110 can include embedded memory, input output interface, and various other circuitries as known in the art. The system 2100 includes at least one memory 2120 (e.g., a volatile memory device, and/or a non-volatile memory device). System 2100 includes a storage device 2140, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 2140 can include an internal storage device, an attached storage device (including detachable and non-detachable storage devices), and/or a network accessible storage device, as non-limiting examples.

System 2100 includes an encoder/decoder module 2130 configured, for example, to process data to provide an encoded video or decoded video, and the encoder/decoder module 2130 can include its own processor and memory. The encoder/decoder module 2130 represents module(s) that can be included in a device to perform the encoding and/or decoding functions. As is known, a device can include one or both of the encoding and decoding modules. Additionally, encoder/decoder module 2130 can be implemented as a separate element of system 2100 or can be incorporated within processor 2110 as a combination of hardware and software as known to those skilled in the art. Program code to be loaded onto processor 2110 or encoder/decoder 2130 to perform the various aspects described in this document can be stored in storage device 2140 and subsequently loaded onto memory 2120 for execution by processor 2110. In accordance with various embodiments, one or more of processor 2110, memory 2120, storage device 2140, and encoder/decoder module 2130 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 2110 and/or the encoder/decoder module 2130 is used to store instructions and to provide working memory for processing that is needed during encoding or decoding. In other embodiments, however, a memory external to the processing device (for example, the processing device can be either the processor 2110 or the encoder/decoder module 2130) is used for one or more of these functions. The external memory can be the memory 2120 and/or the storage device 2140, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 2100 can be provided through various input devices as indicated in block 2230. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 21, include composite video.

In various embodiments, the input devices of block 2230 have associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 2100 to other electronic devices across USB and/or HDMI connections. It is to be understood that various aspects of input processing, for example, Reed-Solomon error correction, can be implemented, for example, within a separate input processing IC or within processor 2110 as necessary. Similarly, aspects of USB or HDMI interface processing can be implemented within separate interface ICs or within processor 2110 as necessary. The demodulated, error corrected, and demultiplexed stream is provided to various processing elements, including, for example, processor 2110, and encoder/decoder 2130 operating in combination with the memory and storage elements to process the data stream as necessary for presentation on an output device.

Various elements of system 2100 can be provided within an integrated housing, within the integrated housing, the various elements can be interconnected and transmit data therebetween using suitable connection arrangement, for example, an internal bus as known in the art, including the Inter-IC (I2C) bus, wiring, and printed circuit boards.

The system 2100 includes communication interface 2150 that enables communication with other devices via communication channel 2160. The communication interface 2150 can include, but is not limited to, a transceiver configured to transmit and to receive data over communication channel 2160. The communication interface 2150 can include, but is not limited to, a modem or network card and the communication channel 2160 can be implemented, for example, within a wired and/or a wireless medium.

Data is streamed, or otherwise provided, to the system 2100, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2160 and the communications interface 2150 which are adapted for Wi-Fi communications. The communications channel 2160 of these embodiments is typically connected to an access point or router that provides access to external networks including the Internet for allowing streaming applications and other over-the-top communications. Other embodiments provide streamed data to the system 2100 using a set-top box that delivers the data over the HDMI connection of the input block 2130. Still other embodiments provide streamed data to the system 2100 using the RF connection of the input block 2130. As indicated above, various embodiments provide data in a non-streaming manner. Additionally, various embodiments use wireless networks other than Wi-Fi, for example a cellular network or a Bluetooth network.

The system 2100 can provide an output signal to various output devices, including a display 2200, speakers 2210, and other peripheral devices 2220. The display 2200 of various embodiments includes one or more of, for example, a touchscreen display, an organic light-emitting diode (OLED) display, a curved display, and/or a foldable display. The display 2200 can be for a television, a tablet, a laptop, a cell phone (mobile phone), or other device. The display 2200 can also be integrated with other components (for example, as in a smart phone), or separate (for example, an external monitor for a laptop). The other peripheral devices 2220 include, in various examples of embodiments, one or more of a stand-alone digital video disc (or digital versatile disc) (DVR, for both terms), a disk player, a stereo system, and/or a lighting system. Various embodiments use one or more peripheral devices 2220 that provide a function based on the output of the system 2100. For example, a disk player performs the function of playing the output of the system 2100.

In various embodiments, control signals are communicated between the system 2100 and the display 2200, speakers 2210, or other peripheral devices 2220 using signaling such as AV.Link, Consumer Electronics Control (CEC), or other communications protocols that enable device-to-device control with or without user intervention. The output devices can be communicatively coupled to system 2100 via dedicated connections through respective interfaces 2170, 2180, and 2190. Alternatively, the output devices can be connected to system 2100 using the communications channel 2160 via the communications interface 2150. The display 2200 and speakers 2210 can be integrated in a single unit with the other components of system 2100 in an electronic device such as, for example, a television. In various embodiments, the display interface 2170 includes a display driver, such as, for example, a timing controller (T Con) chip.

The display 2200 and speaker 2210 can alternatively be separate from one or more of the other components, for example, if the RF portion of input 2230 is part of a separate set-top box. In various embodiments in which the display 2200 and speakers 2210 are external components, the output signal can be provided via dedicated output connections, including, for example, HDMI ports, USB ports, or COMP outputs.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present embodiments, an apparatus 2100 for video encoding and/or decoding is provided, the apparatus including a processor 2110, and at least one memory 2120, 2140 coupled to the processor, the processor 2110 being configured to perform any of the embodiments of the method 800, 900, 1600 and/or 1700 described above.

According to an aspect of the present disclosure, an apparatus for video encoding and/or decoding is provided including means for using a syntax element indicating whether the decoding data are explicitly coded in the video bitstream or inferred from previous data of the video bitstream. The video encoder of FIG. 1 may include the structure or means of the apparatus. The apparatus for video encoding may perform any of the embodiments of any of the methods 800, 900, 1600 and 1700.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Moreover, any of the methods 800, 900, 1600 and/or 1700 may be implemented as a computer program product (independently or jointly) comprising computer executable instructions which may be executed by a processor. The computer program product having the computer-executable instructions may be stored in the respective transitory or non-transitory computer-readable storage media of the system 2100, encoder 100 and/or decoder 200.

It is important to note that one or more of the elements in the processes 800, 900, 1600 and/or 1700 may be combined, performed in a different order, or excluded in some embodiments while still implementing the aspects of the present disclosure. Other steps may be performed in parallel, where the processor does not wait for a full completion of a step before starting another.

Furthermore, aspects of the present embodiments can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present embodiments, a computer-readable storage medium carrying a software program is provided including program code instructions for performing any of the embodiments of any of the methods of the present embodiments, including methods 800, 900, 1600 and/or 1700.

The invention claimed is:

1. A method for encoding video data comprising:
   encoding a syntax element indicating whether a plurality of constraint flags, each controlling an activation of a coding tool, are explicitly coded in a first portion of a video bitstream or whether all constraint flags of the plurality are inferred from a single binary value.

2. The method of claim 1, wherein the plurality of constraint flags is split into subsets of constraint flags and, for at least one of the subsets of constraint flags, another syntax element indicates whether the constraint flags of that subset are explicitly coded in the video bitstream or inferred from the single binary value.

3. The method of claim 1, further comprising encoding the plurality of constraint flags based on the syntax element and encoding an image block based on the plurality of constraint flags.

4. A non-transitory computer readable storage medium having stored thereon instructions for causing one or more processors to implement a method for encoding video data comprising:
   encoding a syntax element indicating whether a plurality of constraint flags, each controlling an activation of a coding tool, are explicitly coded in a first portion of a video bitstream or whether all constraint flags of the plurality are inferred from a single binary value.

5. The non-transitory computer readable storage medium of claim 4, wherein the plurality of constraint flags is split into subsets of constraint flags and, for at least one of the subsets of constraint flags, another syntax element indicates whether the constraint flags of that subset are explicitly coded in the video bitstream or inferred from the single binary value.

6. The non-transitory computer readable storage medium of claim 4, wherein the method further comprises encoding the plurality of constraint flags based on the syntax element and encoding an image block based on the plurality of constraint flags.

7. A method for decoding video data comprising:
   decoding a syntax element indicating whether a plurality of constraint flags, each controlling an activation of a coding tool, are explicitly coded in a first portion of a video bitstream or whether all constraint flags of the plurality are inferred from a single binary value.

8. The method of claim 7, wherein the plurality of constraint flags comprises subsets of constraint flags and, for at least one of the subsets of constraint flags, another syntax element indicates whether the constraint flags of that subset are explicitly coded in the video bitstream or inferred from the single binary value.

9. The method of claim 7, further comprising obtaining the plurality of constraint flags based on the syntax element and decoding an image block based on the plurality of constraint flags.

10. An apparatus for encoding video data, comprising:
    electronic circuitry configured for:
    encoding a syntax element indicating whether a plurality of constraint flags, each controlling an activation of a coding tool, are explicitly coded in a first portion of a video bitstream or whether all constraint flags of the plurality are inferred from a single binary value.

11. The apparatus of claim 10, wherein the plurality of constraint flags is split into subsets of constraint flags and, for at least one of the subsets of constraint flags, another syntax element indicates whether the constraint flags of that subset are explicitly coded in the video bitstream or inferred from the single binary value.

12. The apparatus of claim 10, wherein the electronic circuitry is further configured for encoding the plurality of constraint flags based on the syntax element and encoding an image block based on the plurality of constraint flags.

13. An apparatus for decoding video data, comprising:
    electronic circuitry configured for:
    decoding a syntax element indicating whether a plurality of constraint flags, each controlling an activation of a coding tool, are explicitly coded in a first portion of a video bitstream or whether all constraint flags of the plurality are inferred from a single binary value.

14. The apparatus of claim 13, wherein the plurality of constraint flags comprises subsets of constraint flags and, for at least one of the subsets of constraint flags, another syntax element indicates whether the constraint flags of that subset are explicitly coded in the video bitstream or inferred from the single binary value.

15. The apparatus of claim 13, wherein the electronic circuitry is further configured for obtaining the plurality of constraint flags based on the syntax element and decoding an image block based on the plurality of constraint flags.

16. A non-transitory computer readable storage medium having stored thereon instructions for causing one or more processors to implement a method for decoding video data comprising:
 decoding a syntax element indicating whether a plurality of constraint flags, each controlling an activation of a coding tool, are explicitly coded in a first portion of a video bitstream or whether all constraint flags of the plurality are inferred from a single binary value.

17. The non-transitory computer readable storage medium of claim 16, wherein the plurality of constraint flags comprises subsets of constraint flags and, for at least one of the subsets of constraint flags, another syntax element indicates whether the constraint flags of that subset are explicitly coded in the video bitstream or inferred from the single binary value.

18. The non-transitory computer readable storage medium of claim 16, wherein the method further comprises obtaining the plurality of constraint flags based on the syntax element and decoding an image block based on the plurality of constraint flags.

* * * * *